United States Patent Office 3,030,386
Patented Apr. 17, 1962

3,030,386
PEROXIDES AND A PROCESS FOR THEIR MANUFACTURE
Klaus Weissermel and Michael Lederer, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 15, 1958, Ser. No. 748,600
Claims priority, application Germany July 23, 1957
15 Claims. (Cl. 260—345.9)

The present invention relates to novel peroxides and to a process for their manufacture.

It is known that peroxide acetals which are free of halogen can be obtained by adding hydroperoxides to vinyl ethers with the aid of a catalytic amount of sulfuric acid.

Now we have found that a novel group of halogen-containing peroxide acetals of the general formulae

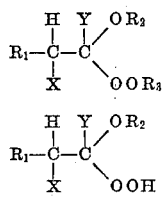

(1)

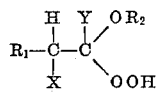

(2)

and

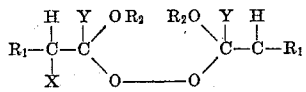

(3)

can be obtained by reacting vinyl ethers of the formula

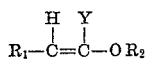

with hydroperoxides of the formula $$R_3OOH$$

or with hydrogen peroxide in the presence of compounds of the formula $$BOX$$

which may yield positive halogen, such as hypohalogenites (for example organic hypochlorites or hypobromites).

The halogen-containing peroxide acetals prepared by the process of the invention can be defined by the general formula

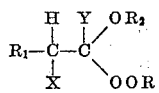

wherein R represents a hydrogen atom, an alkyl radical, preferably a tertiary alkyl radical having 4–8 carbon atoms, a substituted, for example halogen-substituted, alkyl radical or a heterocyclic radical. There may be mentioned the following monovalent radicals: tertiary butyl, tertiary amyl, indan, cumene, tetrahydronaphthalenes, para-menthane, tetrahydrofuran. R may furthermore stand for the radical

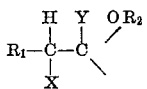

wherein $R_1$, $R_2$, Y and X have the following meanings which likewise apply to the above Formulae 1, 2 and 3.

$R_1$ and $R_2$ may represent the same or different aliphatic, cycloaliphatic and aromatic hydrocarbon radicals having 1–10 carbon atoms, for example the same or different straight-chain or branched, if desired unsaturated, alkyl, substituted alkyl, aryl or heterocyclic radicals. $R_1$ may likewise stand for hydrogen, $R_2$ preferably represents a n- or iso-alkyl radical having 1–6 carbon atoms.

The term alkyl radicals is here intended to include also cyclic and condensed cyclic radicals and substituted alkyl radicals include also those carrying, for example, halogen or aromatic radicals. More especially $R_1$ and $R_2$ may be members of a ring system, preferably consisting of 5 or 6 ring atoms, the oxygen atom situated in Formulae 1–4 beside the radical $R_2$ acting as heterogeneous ring atom.

There are mentioned for example as alkyl radicals the methyl, ethyl, propyl, butyl, isopropyl, isobutyl, amyl, hexyl, 2-ethyl-hexyl, cyclohexyl, methyl-cyclohexyl and the indan radical, as substituted alkyl radicals the β-chloro-ethyl, phenyl-ethyl, phenyl-isopropyl, diphenyl-methyl radical, as aryl radicals the phenyl and naphthyl radical, and as heterocyclic radicals the tetrahydrofurfuryl and tetrahydropyranyl radical.

The radical $R_3$ may represent an alkyl, substituted alkyl or heterocyclic radical.

As hydroperoxides there may be used tertiary butyl-hydroperoxide, tertiary amyl-hydroperoxide, indan-hydroperoxide, cumene-hydroperoxide, tetrahydronaphthalene-peroxide, para-menthane-hydroperoxide, tetrahydrofuran-hydroperoxide.

Y represents a hydrogen atom or a saturated aliphatic radical having 1–6 carbon atoms, such as the methyl, ethyl or propyl radical.

X represents a halogen having an atomic weight of 19 to 127, preferably chlorine or bromine and B in the formula BOX stands for a straight-chain or branched alkyl radical or a substituted alkyl radical of 2–10 carbon atoms and preferably a radical of 4–8 carbon atoms wherein the hypohalogenite group is bound to a tertiary carbon atom. As hypohalogenites there are mentioned for example tertiary butyl-hypochlorite and tertiary amyl-hypochlorite.

The reaction of vinyl ethers with organic hypoperoxide or hydrogen peroxide and with organic hypohalogenites to obtain α-halogen-acetal-peroxides or α-halogen-acetal-hydroperoxides or bis-α-halogen-acetal-peroxides takes place according to the following equations:

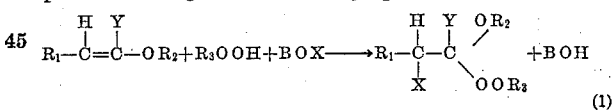

(1)

or

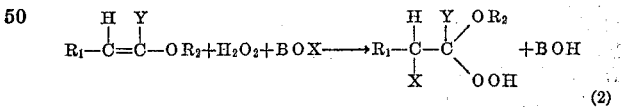

(2)

or

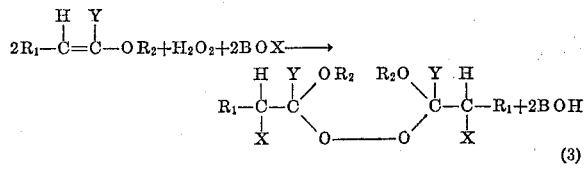

(3)

In the reaction of the vinyl ether component with the organic hydroperoxide according to Equation 1 it may be of advantage to use the vinyl ether component in a slight excess and the hydroperoxide and the hypohalogenite component in equimolar amounts. In the reaction of the vinyl ether component with hydrogen peroxide (cf. Equations 2 and 3) there are obtained mono- or disubstitution products of hydrogen peroxide depending on the quantitative ratio of the reactants.

There may be obtained for example compounds of the formula

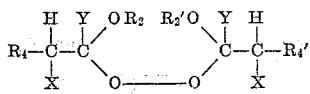

in which $R_4$ and $R_4'$ may be different and $R_2$ and $R_2'$ may likewise be different monovalent hydrocarbon radicals of 1 to 10 carbon atoms or $R_2$ and $R_4$ or $R_2'$ and $R_4'$ may be as bivalent radicals different heterocyclic ring systems of 5 to 6 ring atoms, said system containing carbon, hydrogen and a heteroatom.

It is likewise possible to prepare compounds of the formula

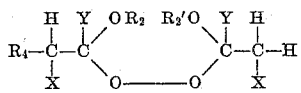

when using in the reaction 1 mol of an unsubstituted vinyl ether.

For the preparation of the monosubstitution product it is of advantage to use an excess of hydrogen peroxide and equimolar amounts of the vinyl ether and the hypohalogenite components. The hydrogen peroxide can be used in the pure state or as a dilute solution of an inert diluent, in the latter case preferably in a concentration of 5 to 15% by weight. Suitable solvents are, for example, dialkyl ether, cyclic ethers such as diethyl ether, diiso-propyl ether, tetrahydrofuran or dioxane. It is likewise possible to use the hydrogen peroxide in the form of its addition products, for example with urea or $SiO_2$.

The addition of a small amount of an acid-binding agent, such as sodium bicarbonate exerts a favorable action on the course of the reactions described above.

In the reaction with hydrogen peroxide it is also possible to prepare first the monosubstitution products and then to transform them into the disubstitution products by further addition of the vinyl ether component and hypohalogenite. When using in this case another vinyl ether products are obtained in which the hydrogen peroxide is substituted by two different radicals.

The reactions mentioned above can be carried out in the absence of solvents at a temperature in the range between about $-60°$ C. and about $+70°$ C. and preferably between $-30°$ C. and $+5°$ C. In case still lower temperatures are applied, the reaction takes place in general in too slow a manner. When operating at a temperature above 70° C. very stable reactants have generally to be used. It is likewise possible to carry out the reaction in the presence of an inert diluent which is liquid under the reaction conditions, such as aliphatic or cycloaliphatic hydrocarbons and ethers, for example pentane, hexane, heptane, cyclohexane, diethyl ether, dioxane, facilitating for example the removal of the reaction heat.

It is of advantage to add the hypohalogenite slowly, while stirring, and with the exclusion of moisture to the mixture of the reaction components vinyl ether and hydroperoxide in the presence of sodium bicarbonate, if desired with the use of a diluent. The reaction takes place in general very rapidly and the reaction products are then worked up and isolated by the usual organic-preparative methods, for example by distillation or extraction and subsequent fractionation.

By the process of the present invention there are obtained novel peroxide compounds which are well suitable as polymerization and hardening catalysts, for example for vinyl compounds and unsaturated polyester resins.

The following examples serve to illustrate the invention but they are not intended to limit it thereto.

*Example 1*

72 grams of vinyl ether in 50 cc. of absolute diethyl ether and 5 grams of sodium bicarbonate are cooled to $-10°$ C. with exclusion of moisture in a reaction vessel provided with reflux condenser, stirring device and dropping funnel. Then 60 grams of tertiary butyl-hydroperoxide dissolved in 50 cc. of absolute diethyl ether are added to the mixture and subsequently 73 grams of tertiary butyl-hypochlorite are dropped in, while stirring, at $-20$ to $-25°$ C. The reaction is complete after the addition. The reaction product is then admixed with 100 cc. of ether, washed with sodium carbonate solution and water and dried over sodium sulfate.

When the reaction product is distilled under reduced pressure 80 grams of chloroacetaldehyde-acetal-peroxide are obtained having the following formula

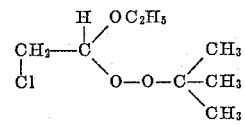

The product has a boiling point of 51° C. under a pressure of 4.5 mm. of mercury and a refractive index $n_D^{20}$ of 1.4225.

*Analysis.*—Summation formula $C_8H_{17}O_3Cl$:

|  | C | H | Cl | Molecular weight |
|---|---|---|---|---|
| calculated | 48.7 | 8.7 | 18.0 | 196.7 |
| found | 49.0 | 8.8 | 17.7 | 193 |

*Example 2*

In the same apparatus as described in Example 1 there are mixed at $-10°$ C. 100 grams of vinyl-isobutyl ether dissolved in 50 cc. of absolute diethyl ether and 5 grams of sodium bicarbonate with 60 grams of tertiary butyl-hydroperoxide in 50 cc. of absolute diethyl ether and the mixture is then reacted at $-20°$ to $-25°$ C. with 73 grams of tertiary butyl-hypochlorite. The reaction product is diluted with 100 cc. of diethyl ether, the solution is washed with aqueous sodium carbonate solution and water, dried over sodium sulfate and distilled under reduced pressure.

There are obtained 91 grams of chloroacetaldehyde-diisobutyl-acetal-tertiary butyl peroxide of the formula

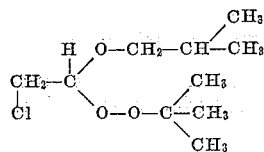

The product has a boiling point of 31–33° C. under a pressure of 0.01 mm. of mercury and a refractive index $n_D^{20}$ of 1.4240.

*Analysis.*—Summation formula $C_{18}H_{21}O_3Cl$:

|  | C | H | Cl | Molecular weight |
|---|---|---|---|---|
| calculated | 53.3 | 9.4 | 15.8 | 224.8 |
| found | 53.4 | 9.5 | 15.1 | 213 |

*Example 3*

60 grams of tertiary butyl-hydroperoxide in 50 cc. of absolute ether are added at $-10°$ C. to 85 grams of dihydropyran in 50 cc. of absolute diethyl ether and 5 grams of sodium bicarbonate. Then there are added to the mixture as described in Examples 1 and 2, 66 grams of tertiary butyl-hypochlorite at $-27$ to $34°$ C. The ethereal solution is washed with sodium carbonate solution and water and dried over potassium carbonate.

The reaction product is distilled under reduced pressure whereupon there are obtained 45.8 grams of the chloro-acetal-peroxide of the formula

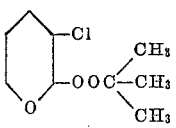

The product has a boiling point of 48–49° C. under a pressure of 0.01 mm. of mercury and a refractive index $n_D^{20}$ of 1.4585.

*Analysis.*—Summation formula $C_9H_{17}O_3Cl$:

|  | C | H | Cl | Molecular weight |
|---|---|---|---|---|
| calculated | 51.7 | 8.2 | 17.0 | 208.7 |
| found | 52.2 | 8.8 | 16.8 | 223 |

Example 4

36 grams of vinyl ether, 155 cc. of an ethereal solution of 7.5% strength by volume of hydrogen peroxide and 10 grams of sodium bicarbonate are cooled to −20° C. with exclusion of moisture in a reaction vessel provided with reflux condenser, stirring device and dropping funnel. Then there are added dropwise to the mixture, while stirring, 54 grams of tertiary butyl-hypochlorite while maintaining the temperature in the range between −15 and −20° C.

After having terminated the reaction, the mixture obtained is washed with a saturated sodium bicarbonate solution and with water and dried over sodium sulfate.

The diethyl ether and the residue of the tertiary butyl alcohol formed in the course of the reaction are then eliminated under reduced pressure. 49.2 grams of a crude product are obtained. When fractionating said product the chloro-hydroperoxide-acetal of the following formula

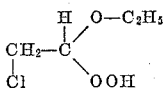

distils over at 45.5–46° C. under a pressure of 1.5 mm. of mercury; it has a refractive index $n_D^{20}$ of 1.4432.

*Analysis.*—Summation formula $C_4H_9O_3Cl$:

|  | C | H | Cl | Molecular weight |
|---|---|---|---|---|
| calculated | 34.2 | 6.5 | 25.3 | 140.4 |
| found | 34.5 | 7.0 | 25.3 | 170 |

Example 5

In the same apparatus as described in Example 4 there are reacted at −10° C. 100 grams of vinylethyl ether (about 1.3 mols), 150 cc. of an ethereal solution of 7.9% strength by volume of hydrogen peroxide (0.5 mol) with 105 grams of tertiary butyl-hypochlorite (about 1 mol) in the presence of 10 grams of sodium bicarbonate. The reaction being terminated, 50 cc. of diethyl ether are added and the reaction product is washed with a sodium carbonate solution and with water and dried over sodium sulfate. The excess vinyl ether, the diethyl ether and the residual tertiary butanol are then eliminated under reduced pressure. 73 grams of a crude product are obtained, a sample of which is fractionated under reduced pressure to yield the disubstitution product of the formula

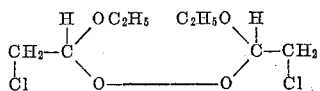

having a boiling point of 66° C. under a pressure of 0.01 mm. of mercury and a refractive index $n_D^{20}$ of 1.4457.

*Analysis.*—Summation formula $C_8H_{16}O_4Cl_2$:

|  | C | H | Cl | Molecular weight |
|---|---|---|---|---|
| calculated | 38.9 | 6.4 | 28.7 | 247 |
| found | 38.8 | 6.9 | 28.7 | 231 |

Example 6

In the apparatus described in Example 4 there are reacted at −15 to −20° C. 50 grams of vinylisobutyl ether and 155 cc. of an ethereal solution of 7.5% strength by volume of hydrogen peroxide with 54 grams of tertiary butyl-hypochlorite in the presence of 10 grams of sodium bicarbonate. The solution is then washed with a saturated aqueous solution of sodium bicarbonate and with water and dried over sodium sulfate.

The residual ether and the tertiary butanol are then removed under reduced pressure. 52.1 grams of a crude product are obtained, a sample of which yields on fractionation the monosubstitution product of hydrogen peroxide of the formula

The product has a boiling point of 59–61° C. under a pressure of 2 mm. of mercury and a refractive index $n_D^{20}$ of 1.4418.

*Analysis.*—Summation formula $C_6H_{13}O_3Cl$:

|  | C | H | Cl | Molecular weight |
|---|---|---|---|---|
| calculated | 42.8 | 7.7 | 21.7 | 168.5 |
| found | 42.7 | 7.8 | 21.1 | 194 |

Example 7

Under the conditions given in Example 4 there are reacted between −10 and −15° C. 42 grams of dihydropyran and 75 cc. of an ethereal solution of 8.3% strength by volume of hydrogen peroxide with 54 grams of tertiary butyl-hypochlorite in the presence of 10 grams of sodium bicarbonate.

The reaction mixture is washed with an aqueous solution of sodium carbonate and with water and dried over sodium sulfate. The readily volatile compounds are then eliminated under a pressure of 1 mm. of mercury and at a bath temperature of 45° C.

33 grams of the disubstitution product of $H_2O_2$ of the following formula are obtained

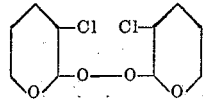

having a refractive index $n_D^{20}$ of 1.4900.

*Analysis.*—Summation formula $C_{10}H_{16}O_4Cl_2$:

|  | C | H | Cl | molecular weight |
|---|---|---|---|---|
| calculated | 44.2 | 5.9 | 26.6 | 271.2 |
| found | 45.8 | 6.5 | 24.2 | 271 |

We claim:
1. A peroxide of the group consisting of those of the formulae

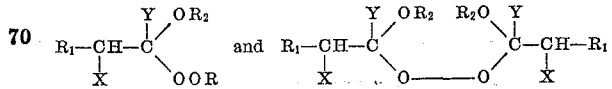

in which R is a member of the group consisting of hydrogen, tertiary alkyl of from 4 to 8 carbon atoms, indanyl, cumenyl, tetrahydronaphthyl, para-menthyl and tetrahydrofuryl, $R_1$ is a member of the group consisting of hydrogen, alkyl of from 1 to 10 carbon atoms, phenyl-substituted lower alkyl, phenyl, naphthyl, indanyl, tetrahydrofuryl and tetrahydropyranyl, $R_2$ is a member of the group consisting of alkyl of from 1 to 10 carbon atoms, phenyl-substituted lower alkyl, phenyl, naphthyl, indanyl, tetrahydrofuryl and tetrahydropyranyl, $R_1$ and $R_2$ in combined form representing the remainder of a 5 to 6-membered heterocyclic ring containing the ether oxygen adjacent $R_2$ as the sole hetero atom, X is a halogen atom having an atomic weight from 35 to 80, and Y is a member of the group consisting of hydrogen and a saturated aliphatic hydrocarbon of 1 to 6 carbon atoms.

2. A peroxide of the formula

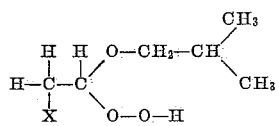

wherein X is a halogen atom having an atomic weight from 35 to 80.

3. A peroxide of the formula

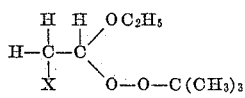

wherein X is a halogen atom having an atomic weight from 35 to 80.

4. A peroxide of the formula

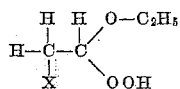

wherein X is a halogen atom having an atomic weight from 35 to 80.

5. A peroxide of the formula

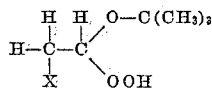

wherein X is a halogen atom having an atomic weight from 35 to 80.

6. A peroxide of the formula

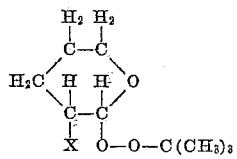

wherein X is a halogen atom having an atomic weight from 35 to 80.

7. A peroxide of the formula

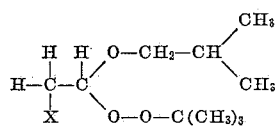

wherein X is a halogen atom having an atomic weight from 35 to 80.

8. A peroxide of the formula

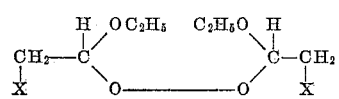

wherein X is a halogen atom having an atomic weight from 35 to 80.

9. A peroxide of the formula

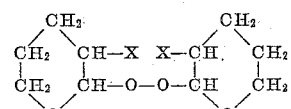

wherein X is a halogen atom having an atomic weight from 35 to 80.

10. A process for preparing a peroxide of the group consisting of those of the formulae

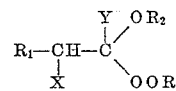

and

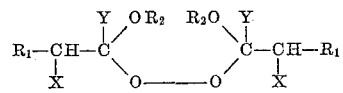

in which R is a member of the group consisting of hydrogen, tertiary alkyl of from 4 to 8 carbon atoms, indanyl, cumenyl, tetrahydronaphthyl, paramenthyl and tetrahydrofuryl, $R_1$ is a member of the group consisting of hydrogen, alkyl of from 1 to 10 carbon atoms, phenyl-substituted lower alkyl, phenyl, naphthyl, indanyl, tetrahydrofuryl and tetrahydropyranyl, $R_2$ is a member of the group consisting of alkyl of from 1 to 10 carbon atoms, phenyl-substituted lower alkyl, phenyl, naphthyl, indanyl, tetrahydrofuryl and tetrahydropyranyl, $R_1$ and $R_2$ in combined form representing the remainder of a 5- to 6-membered heterocyclic ring containing the ether oxygen adjacent $R_2$ as the sole hetero atom, X is a halogen atom having an atomic weight from 35 to 80, and Y is a member of the group consisting of hydrogen and a saturated aliphatic hydrocarbon of 1 to 6 carbon atoms which comprises reacting, at a temperature in the range from about −60° C. to about +70° C., a vinyl ether of the formula

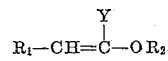

with a hydroperoxide of the formula

R—O—O—H and an organic hypohalogenate of the formula

BOX wherein R, $R_1$, $R_2$, X and Y are as defined above and B is an alkyl group of from 2 to 10 carbon atoms.

11. The process as defined in claim 10 wherein the reaction is carried out at a temperature in the range from about −30° C. to about +5° C.

12. The process as defined in claim 10 wherein the reaction is carried out in the presence of an acid-binding agent.

13. The process as claimed in claim 12 wherein sodium bicarbonate is used as an acid-binding agent.

14. The process as claimed in claim 12 wherein the reaction is carried out in the presence of an inert diluent, which is liquid under the reaction conditions.

15. The process as claimed in claim 12 wherein the hydrogen peroxide is applied in a dilute solution of an inert diluent.

References Cited in the file of this patent
UNITED STATES PATENTS

| | | |
|---|---|---|
| 2,223,807 | Milas | Dec. 3, 1940 |
| 2,802,891 | Feild et al. | Aug. 13, 1957 |
| 2,822,353 | Bankert et al. | Feb. 4, 1958 |

OTHER REFERENCES

Milas et al.: "Ency. of Chem. Tech.," vol. 10, pages 70–71 (1953).

Milas et al.: J. Am. Chem. Soc., 76, pages 2322–25 (1954).